(12) United States Patent
Kato et al.

(10) Patent No.: US 7,275,732 B2
(45) Date of Patent: Oct. 2, 2007

(54) SOLENOID-OPERATED VALVE FOR FUEL CELLS

(75) Inventors: Takahide Kato, Shioya-gun (JP); Kouetsu Hikichi, Kakuda (JP); Hiroto Ohmori, Shioya-gun (JP); Masakazu Murai, Portage, MI (US); Kuri Kasuya, Utsunomiya (JP); Hiroyasu Ozaki, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 8 days.

(21) Appl. No.: 11/291,618

(22) Filed: Nov. 30, 2005

(65) Prior Publication Data

US 2007/0194261 A1    Aug. 23, 2007

(30) Foreign Application Priority Data

Nov. 30, 2004    (JP) .............................. 2004-346905

(51) Int. Cl.
*F16K 31/02* (2006.01)
(52) U.S. Cl. ................. 251/129.15; 251/284; 251/358; 251/363
(58) Field of Classification Search ........... 251/129.15, 251/284, 358, 360, 363
See application file for complete search history.

(56) References Cited

U.S. PATENT DOCUMENTS 3,712,581 A * 1/1973 Parlow .................. 251/129.15
4,085,921 A * 4/1978 Ueda et al. ............. 251/129.08
5,503,366 A * 4/1996 Zabeck et al. ......... 251/129.18
5,791,747 A * 8/1998 Sorensen et al. ....... 251/129.15
5,992,822 A * 11/1999 Nakao et al. ........... 251/129.15
6,644,623 B1 * 11/2003 Voss et al. .............. 251/129.15
6,679,567 B1 * 1/2004 Tackett et al. .......... 251/129.15
6,739,571 B2 * 5/2004 Hironaka ................ 251/129.15
6,994,406 B1 * 2/2006 Krawczyk et al. ...... 251/129.15
2002/0142197 A1   10/2002 Kato et al.
2004/0159811 A1 * 8/2004 Ueda ...................... 251/129.15

FOREIGN PATENT DOCUMENTS

JP    2002-305017    10/2002

* cited by examiner

*Primary Examiner*—John Bastianelli
(74) *Attorney, Agent, or Firm*—Lahive & Cockfield, LLP; Anthony A. Laurentano, Esq.

(57) ABSTRACT

A valve housing has a bottomed hollow cylindrical main body and a boss projecting from and smaller in diameter than the main body. The main body has a tapered surface circumferentially along a joint where a side wall and a bottom wall of the main body are joined to each other. A plurality of inlet ports are defined in the tapered surface. The boss has an outlet port for discharging a fluid introduced into the main body. When a valve head coupled to the movable member is displaced and a seating ridge of a resilient member mounted on the valve head is seated on a valve seat surface, the inlet ports and the outlet port are brought out of fluid communication with each other.

11 Claims, 7 Drawing Sheets

SOLENOID-OPERATED VALVE FOR FUEL CELLS

BACKGROUND OF THE INVENTION

1. Field of the Invention

The present invention relates to a solenoid-operated valve for discharging a reaction gas and/or residual water from fuel cells of a fuel cell system.

2. Description of the Related Art

Solid polymer membrane fuel cell devices have a stack of cells each comprising a solid polymer electrolyte membrane sandwiched between an anode and a cathode that are disposed one on each side of the solid polymer electrolyte membrane. For operating such a stack of cells, hydrogen is supplied as a fuel to the anode and air is supplied as an oxidizing agent to the cathode. Hydrogen ions are generated at the anode by a catalytic reaction, and move through the solid polymer electrolyte membrane to the cathode where they cause an electrochemical reaction to generate electric power.

The above fuel cell devices have an air compressor or the like for supplying air as a reaction gas to the cathodes of the fuel cells, and a pressure control valve for supplying hydrogen as a reaction gas to the anodes of the fuel cells under a pressure depending on the pressure of the air, using the pressure of the air as a signal pressure. The pressure of the reaction gas applied to the anodes with respect to the cathodes is regulated to a certain pressure by the pressure control valve for achieving a predetermined power generating efficiency, and the rate of the reaction gas supplied to the fuel cells is controlled to obtain a predetermined output level.

KEHIN CORPORATION has proposed a residual water discharging device for discharging residual water from fuel cells (see Japanese Laid-Open Patent Publication No. 2002-305017). The proposed residual water discharging device has a cathode drain valve disposed at a suitable position in an air passage in the fuel cell system, for discharging air and residual water from the fuel cell system, and an anode drain valve disposed at a suitable position in a hydrogen passage in the fuel cell system, for discharging hydrogen and residual water from the fuel cell system.

SUMMARY OF THE INVENTION

It is a general object of the present invention to provide a solenoid-operated valve for use with fuel cells which has a valve housing that projects a reduced distance when installed on a companion member, so that the solenoid-operated valve occupies less space.

The above and other objects, features, and advantages of the present invention will become more apparent from the following description when taken in conjunction with the accompanying drawings in which a preferred embodiment of the present inventions is shown by way of illustrative example.

DESCRIPTION OF THE PREFERRED EMBODIMENT

Figure 1:
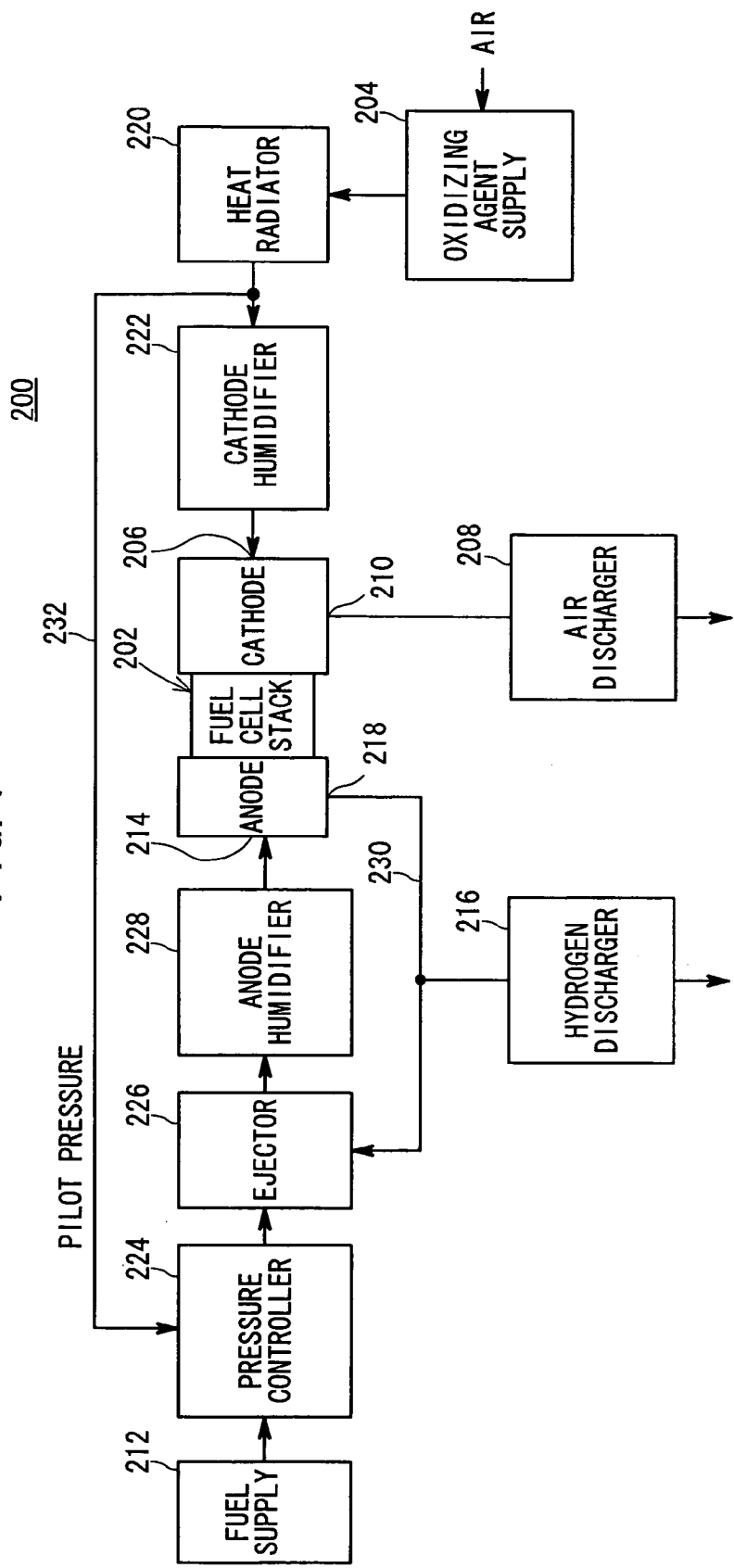
FIG. 1 is a block diagram of a fuel cell system which incorporates a solenoid-operated valve for fuel cells according to an embodiment of the present invention.

FIG. 1 is a block diagram of a fuel cell system 200 which incorporates a solenoid-operated valve for use with fuel cells according to an embodiment of the present invention. The fuel cell system 200 is mounted on a vehicle such as an automobile or the like.

As shown in FIG. 1, the fuel cell system 200 includes a fuel cell stack 202 having a stack of cells each comprising a solid polymer electrolyte membrane, such as a polymer ion exchange membrane or the like, sandwiched between an anode and a cathode that are disposed one on each side of the polymer electrolyte membrane. The fuel cell stack 202 has anodes for being supplied with hydrogen, for example, as a fuel and cathodes for being supplied with air containing oxygen, for example, as an oxidizing agent. A reaction gas used in the present embodiment collectively refers to hydrogen, air, and excessive gas.

The cathode has an air supply port 206 for being supplied with air from an oxidizing agent supply 204 and an air discharge port 210 connected to an air discharger 208 for discharging air in the cathode. The anode has a hydrogen supply port 214 for being supplied with hydrogen from a fuel supply 212 and a hydrogen discharge port 218 connected to a hydrogen discharger 216.

In the fuel cell stack 202, hydrogen ions that are generated at the anode by a catalytic reaction move through the solid polymer electrolyte membrane to the cathode where the hydrogen ions and oxygen cause an electrochemical reaction to generate electric power.

To the air supply port 206, there are connected the oxidizing agent supply 204, a heat radiator 220, and a cathode humidifier 222 through an air supply passage. The air discharger 208 is connected to the air discharge port 210 through an air discharge passage.

To the hydrogen supply port 214, there are connected the fuel supply 212, a pressure controller 224, an ejector 226, and an anode humidifier 228 through a hydrogen supply passage. The hydrogen discharger 216 is connected to the hydrogen discharge port 218 by a circulation passage 230.

The oxidizing agent supply 204 comprises, for example, a supercharger (compressor) and a motor for actuating the supercharger (not shown). The oxidizing agent supply 204 adiabatically compresses air, which is to be used as an oxidizing gas in the fuel cell stack 202, and delivers the compressed air to the fuel cell stack 202. When the air is adiabatically compressed, it is heated. The heated air is effective to warm the fuel cell stack 202.

The air supplied from the oxidizing agent supply 204 is introduced into the fuel cell stack 202 under a preset pressure depending on a load on the fuel cell stack 202, a degree of an accelerator pedal (not shown) pressed, or the like. After the air supplied from the oxidizing agent supply 204 is cooled by the heat radiator 220, a portion of the air is supplied as a pilot pressure through a bypass passage 232 to the pressure controller 224.

The heat radiator 220 comprises an intercooler or the like (not shown), for example. The air supplied from the oxidizing agent supply 204 is cooled by a heat exchange with cooling water which flows through a flow passage while the fuel cell stack 202 is in normal operation. Therefore, the air is cooled to a predetermined temperature and then introduced into the cathode humidifier 222.

The cathode humidifier 222 has a water-permeable membrane, for example. The cathode humidifier 222 humidifies the air, which has been cooled to the predetermined temperature by the heat radiator 220, to a certain humidity by passing water from one side of the water-permeable membrane to the other, and supplies the humidified air to the air supply port 206 of the fuel cell stack 202. The humidified air is supplied to the fuel cell stack 202 to keep the ion conductivity of the solid polymer electrolyte membranes in the fuel cell stack 202 at a certain level. The air discharger 208 is connected to the air discharge port 210 of the fuel cells stack 202. Air is discharged into the atmosphere through a discharge valve (not shown) of the air discharger 208.

The fuel supply 212 comprises a hydrogen gas container (not shown) for supplying hydrogen as a fuel to the fuel cells, for example. The fuel supply 212 stores hydrogen that is to be supplied to the anode of the fuel cell stack 202.

The pressure controller 224 comprises a pneumatic proportional pressure control valve, for example. Using the pressure of air from the bypass passage 232 as a pilot pressure (pilot signal pressure), the pressure controller 224 sets a secondary pressure as its outlet pressure to a pressure in a predetermined range corresponding to the pilot pressure.

The ejector 226 comprises a nozzle and a diffuser (not shown). The fuel (hydrogen) supplied from the pressure controller 224 is accelerated when it passes through the nozzle, and ejected toward the diffuser. When the fuel flows at a high speed from the nozzle to the diffuser, a negative pressure is developed in an auxiliary chamber disposed between the nozzle and the diffuser, attracting the fuel discharged from the anode through the circulation passage 230. The fuel and the discharged fuel that are mixed together by the ejector 226 are supplied to the anode humidifier 228. The fuel discharged from the fuel cell stack 202 circulates through the ejector 226.

Therefore, the unreacted gas discharged from the hydrogen discharge port 218 of the fuel cell stack 202 is introduced through the circulation passage 230 into the ejector 226. The hydrogen supplied from the pressure controller 224 and the gas discharged from the fuel cell stack 202 are mixed with each other and supplied again to the fuel cell stack 202.

The anode humidifier 228 has a water-permeable membrane, for example. The anode humidifier 228 humidifies the fuel, which has been delivered from the ejector 226, to a certain humidity by passing water from one side of the water-permeable membrane to the other, and supplies the humidified fuel to the hydrogen supply port 214 of the fuel cell stack 202. The humidified hydrogen is supplied to the fuel cell stack 202 to keep the ion conductivity of the solid polymer electrolyte membranes of the fuel cell stack 202 at a certain level.

The hydrogen discharger 216 which has a discharge control valve, not shown, is connected to the hydrogen discharge port 218 of the fuel cell stack 202 by the circulation passage 230. The discharge control valve can be opened and closed depending on an operating state of the fuel cell stack 202 for discharging, out of the vehicle, excessive water (mainly liquid water) in a discharged gas which has been separated by a reservoir tank, not shown.

The solenoid-operated valve, denoted by 10, for discharging a reaction gas (hydrogen) and/or residual water is disposed at a suitable position in an air discharge passage interconnecting the air discharge port 210 and the air discharger 208 or at a suitable position in the circulation passage 230 interconnecting the hydrogen discharger 216 and the hydrogen discharge port 218.

Details of the solenoid-operated valve 10 (also referred to as "discharge valve 10") incorporated in the fuel cell system 200 will be described below with reference to FIGS. 2 through 7.

As shown in FIGS. 2 through 5, the discharge valve 10 includes a valve housing 16 having inlet ports 12 for introducing hydrogen (hereinafter referred to as "fluid") and/or residual water into the valve housing 16 and an outlet port 14 for discharging the fluid and/or the residual water out of the valve housing 16. The discharge valve 10 also has a guide body 20 coupled to an upper end of the valve housing 16 and housing a movable member 18 for axial displacement, a solenoid housing 22 coupled to an upper end of the guide body 20, a solenoid 24 disposed in the solenoid housing 22, a cover member 26 mounted to cover an outer surface of the solenoid housing 22, and a valve head 28 (see FIGS. 4 and 5) axially displaceably disposed in the valve housing 16.

Figure 4:
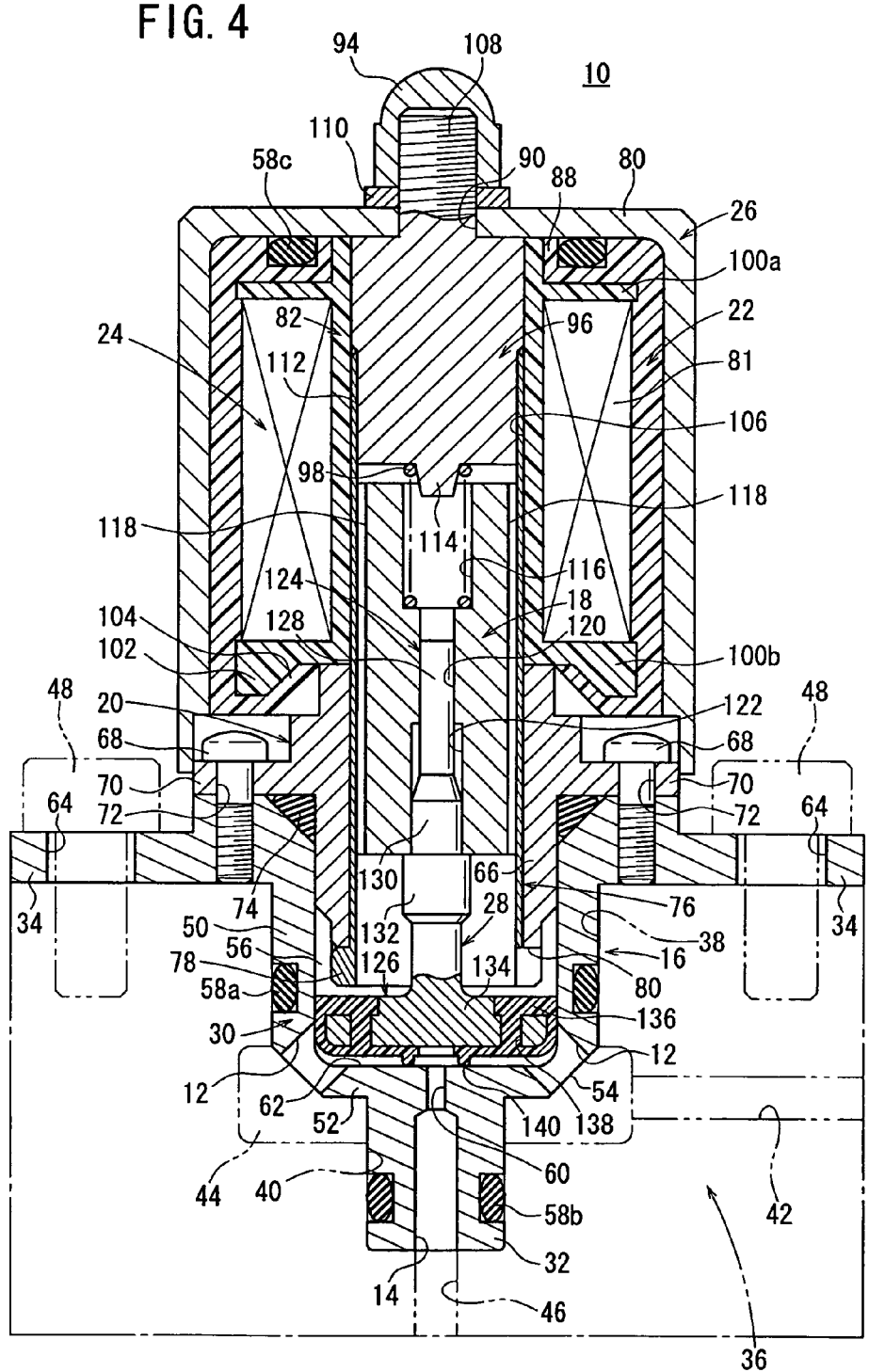
FIG. 4 is a vertical cross-sectional view taken alone line IV-IV of FIG. 3.
Figure 5:
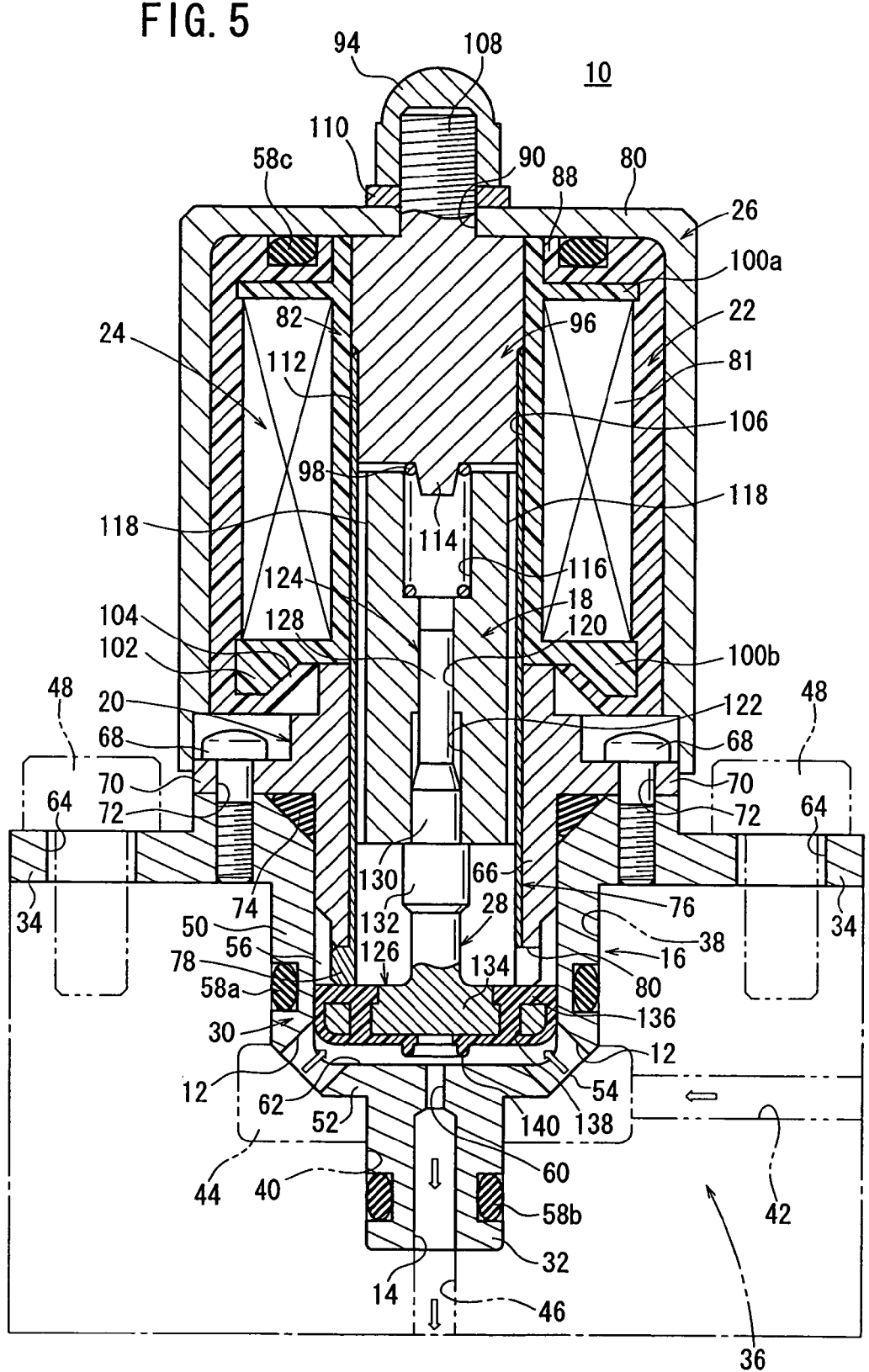
FIG. 5 is a vertical cross-sectional view of the solenoid-operated valve shown in FIG. 4 as it is open.

As shown in FIGS. 4 and 5, the valve housing 16 is made of a metallic material such as stainless steel, and includes a main body (first hollow cylindrical portion) 30 with the valve head 28 displaceably housed therein, a boss (second hollow cylindrical portion) 32 projecting downwardly from the main body 30, and a mounting flange 34 extending radially outwardly from an upper end of the main body 30. The valve housing 16 is mounted on a holder block 36 with fluid passages defined therein.

The holder block 36 will briefly be described below. The holder block 36 has a first insertion hole 38 defined therein with the main body 30 of the valve housing 16 being inserted therein, a second insertion hole 40 defined therein beneath the first insertion hole 38 and having a diameter smaller than the first insertion hole 38, an inlet passage 42 defined therein substantially horizontally for being supplied with a fluid from outside, an annular inlet chamber 44 defined therein in fluid communication with the inlet passage 42 and joined to the first insertion hole 38, and an outlet passage 46 defined therein in fluid communication with the second insertion hole 40 for passing the fluid discharged from the outlet port 14 in the boss 32 through.

The valve housing 16 is fastened to an upper surface of the holder block 36 by mounting bolts 48 extending through the mounting flange 34. The discharge valve 10, however, is not limited to being mounted on the holder block 36.

The main body 30 of the valve housing 16 is in the form of a bottomed hollow cylinder, and includes a cylindrical side wall (side) 50 extending substantially parallel to the axis of the main body 30, a bottom wall (bottom) 52 lying substantially perpendicularly to the side wall 50, and a tapered surface 54 extending along an outer circumferential surface of a corner where the side wall 50 and the bottom wall 52 are joined to each other. The tapered surface 54 is inclined at an angle of about 45° to the axis of the main body 30, i.e., to the side wall 50 and the bottom wall 52. The inlet ports 12 are defined through the corner substantially perpendicularly to the tapered surface 54.

The inlet ports 12 comprise four inlet ports, for example, angularly spaced at equal angular intervals in the circumferential direction of the main body 30. The inlet ports 12 are held in fluid communication with a communication chamber 56 that is defined in the main body 30.

The inlet ports 12 are positioned in facing relation to the annular inlet chamber 44 in the holder block 36 when the valve housing 16 is mounted on the holder block 36. Since the inlet ports 12 are surrounded by the inlet chamber 44 which is supplied with the fluid from outside, no process is required to positionally align the inlet ports 12 with the inlet chamber 44. Therefore, the valve housing 16 including the inlet ports 12 can efficiently be mounted on the holder block 36.

Because the inlet ports 12 are defined in the corner of the valve housing 16 near the bottom wall 52 thereof, the valve housing 16 may be of a smaller axial longitudinal dimension than if the inlet ports 12 are defined in the side wall 50 of the valve housing 16.

As the inlet ports 12 may be positioned anywhere in the main body 30 along the tapered surface 54, the number of the inlet ports 12 and the layout thereof may be flexibly selected. The total cross-sectional area of the inlet ports 12 can thus easily be changed to control the rate of the fluid that is introduced from the inlet ports 12 into the communication chamber 56.

An O-ring 58a is mounted in an annular groove defined in an outer circumferential surface of the side wall 50 of the main body 30. When the main body 30 is inserted into the first insertion hole 38 in the holder block 36, the O-ring 58a is clamped between an inner circumferential surface of the first insertion hole 38 and an outer circumferential surface of the main body 30, thereby hermetically sealing the gap between the inner surface of the holder block 36 and the main body 30.

The boss 32 projects a predetermined distance downwardly from a substantially central area of the bottom wall 52 of the main body 30. The boss 32 has an outside diameter smaller than the outside diameter of the main body 30. The boss 32 is disposed coaxially with the main body 30. When the valve housing 16 is mounted on the holder block 36, the boss 32 is inserted into the second insertion hole 40 that is smaller in diameter than the first insertion hole 38.

The single outlet port 14 is defined in a lower end portion of the boss 32 and is open downwardly. The outlet port 14 serves to discharge fluid introduced into the communication chamber 56. The outlet port 14 is held in fluid communication with the communication chamber 56 through a communication passage 60 that is smaller in diameter than the outlet port 14. The outlet port 14 and the communication passage 60 are disposed coaxially with the main body 30. The communication passage 60 has an upper end that is open at the bottom of the main body 30 that functions as a valve seat surface (valve seat) 62. The valve head 28 has a seating ridge 140 which can be seated on and unseated from the valve seat surface 62.

The outlet port 14 is held in fluid communication with the outlet passage 46 in the holder block 36 which is positioned in alignment with the outlet port 14. The fluid discharged from the outlet port 14 is discharged through the outlet passage 46 out of the holder block 36.

The outlet port 14 has a cross-sectional area which is smaller than the total cross-sectional area representing the sum of cross-sectional areas of the inlet ports 12. Therefore, since the total rate of the fluid introduced from the inlet ports 12 is greater than the rate of the fluid discharged from the outlet port 14, the fluid can reliably be discharged from the outlet port 14.

An O-ring 58b is mounted in an annular groove defined in an outer circumferential surface of the boss 32. The O-ring 58b is clamped between an inner circumferential surface of the second insertion hole 40 and an outer surface of the boss 32, thereby hermetically sealing the gap between the holder block 36 and the boss 32.

Figure 3:
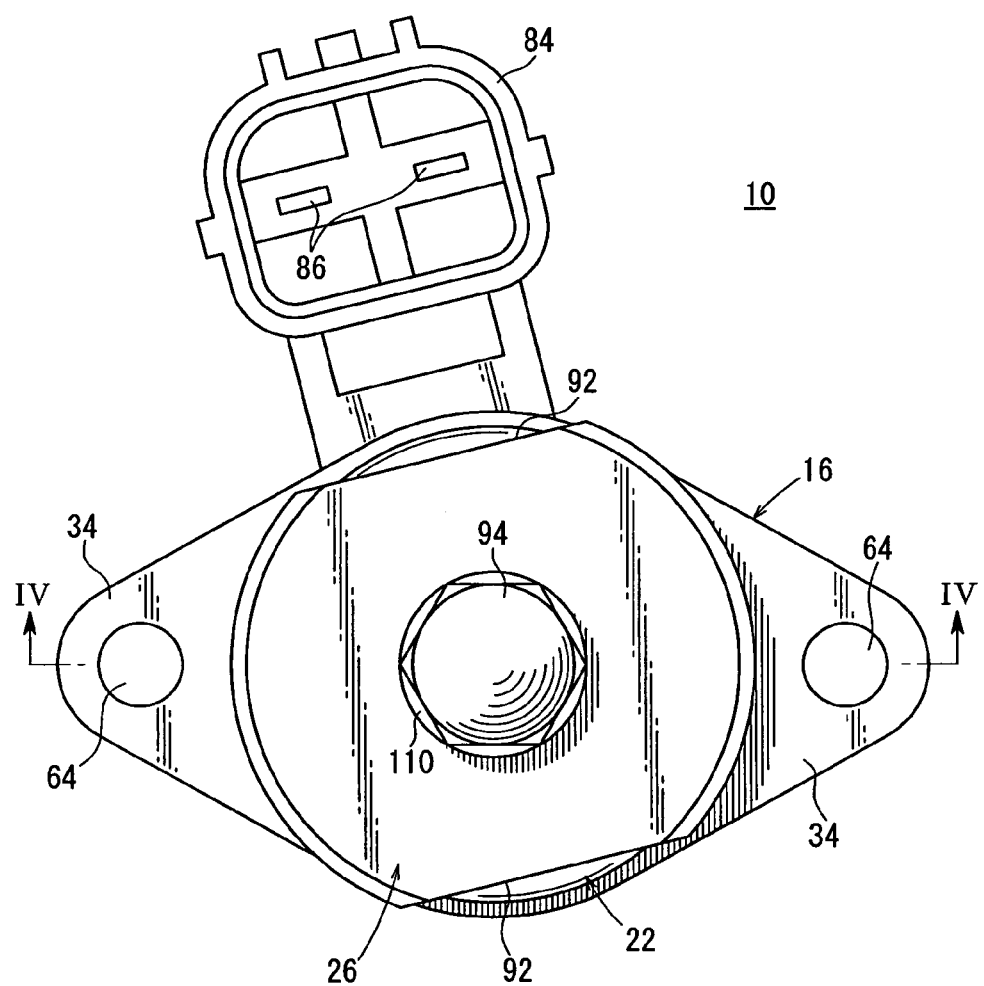
FIG. 3 is a plan view of the solenoid-operated valve shown in FIG. 2.

As shown in FIG. 3, the mounting flange 34 has a pair of diametrically opposite holes 64 defined therein which are spaced a predetermined distance radially outwardly from the main body 30 (see also FIG. 4). The mounting bolts 48 are inserted through the respective holes 64 and threaded into the holder block 36, thereby fastening the mounting flange 34 to the upper surface of the holder block 36.

The guide body 20 is in the form of a sleeve comprising a hollow cylinder 66 in which the movable member 18 is displaceably disposed and a flange 70 projecting radially outwardly from the hollow cylinder 66. The flange 70 has a plurality of holes 72 defined therein and spaced at predetermined intervals in the circumferential direction thereof. Joint bolts 68 are inserted through the respective holes 72 and threaded into an upper surface of the valve housing 16, thereby fastening the guide body 20 and the valve housing 16.

The lower portion of the hollow cylinder 66 is inserted into the main body 30 of the valve housing 16, with an annular seal 74 interposed between the corner of the joint between the hollow cylinder 66 and the flange 70 and the main body 30. The annular seal 74 serves to keep the interior of the valve housing 16 hermetically sealed.

A cylindrical collar guide (guide member) 76 having a substantially constant diameter is inserted in the hollow cylinder 66. The collar guide 76 has an annular flange 78 disposed on a lower end thereof and engaged with a lower end of the hollow cylinder 66. The collar guide 76 comprises a thin-walled hollow cylinder made of a metallic material. The flange 78 projects radially outwardly and has an upper surface held against the lower end surface of the hollow cylinder 66 and fixed thereto by laser beam welding or the like. Therefore, an inner circumferential surface of the hollow cylinder 66 is surrounded by the collar guide 76.

The flange 78 has a stopper function to prevent the valve head 28 from being further displaced toward the guide body 20 after the valve head 28 has been displaced. A plurality of (four in the illustrated embodiment) recesses 80 defined in the lower surface thereof that is engageable by the valve head 28 and spaced at equal intervals in the circumferential direction thereof. The recesses 80 defined in the flange 78 are effective to prevent the valve head 28, which is made of an elastic material, from sticking to the flange 78 when the valve head 28 abuts against the flange 78.

Figure 6:
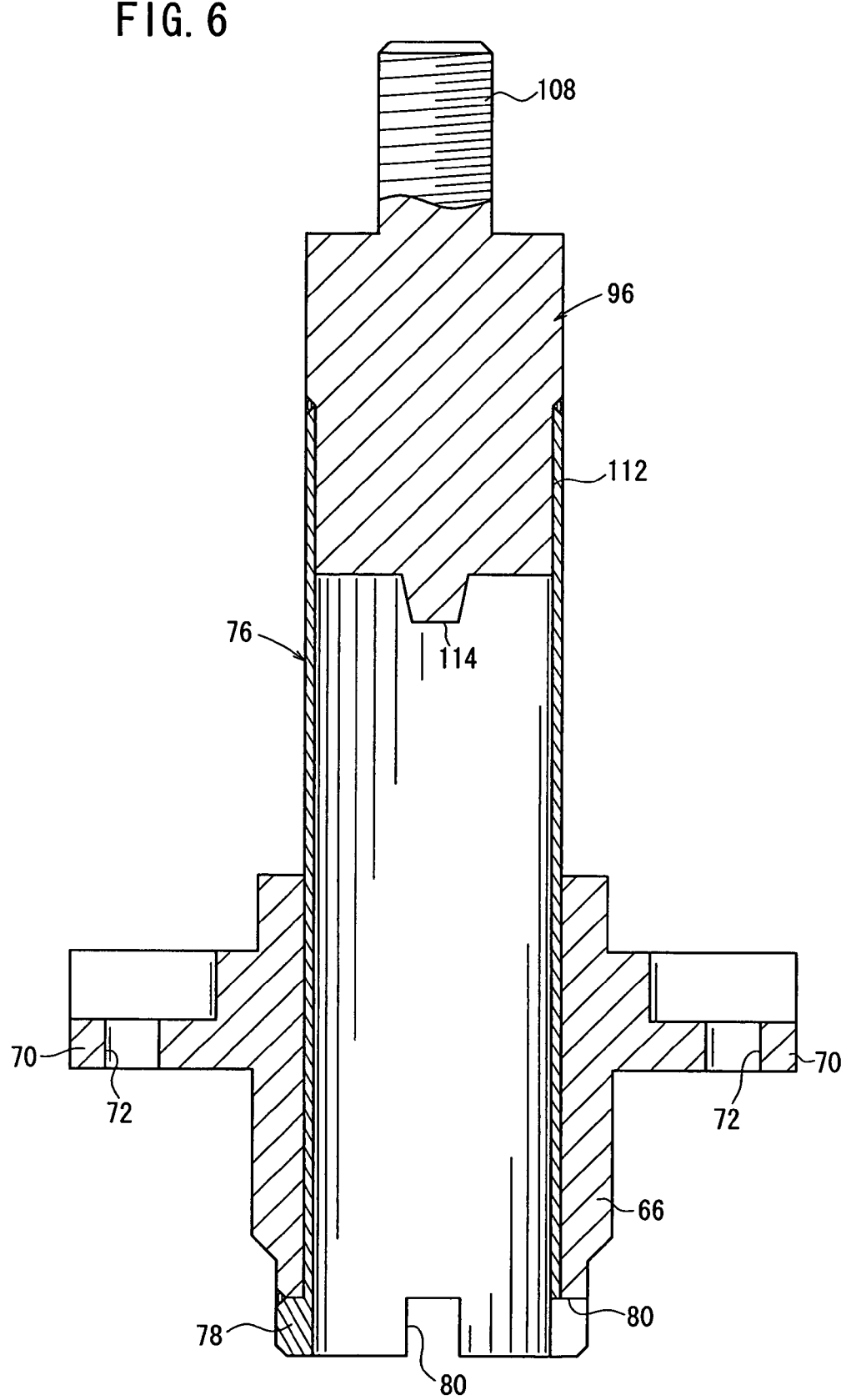
FIG. 6 is a vertical cross-sectional view showing a guide body and a fixing member that are connected to each other by a collar guide in the solenoid-operated valve shown in FIG. 2.
Figure 7:
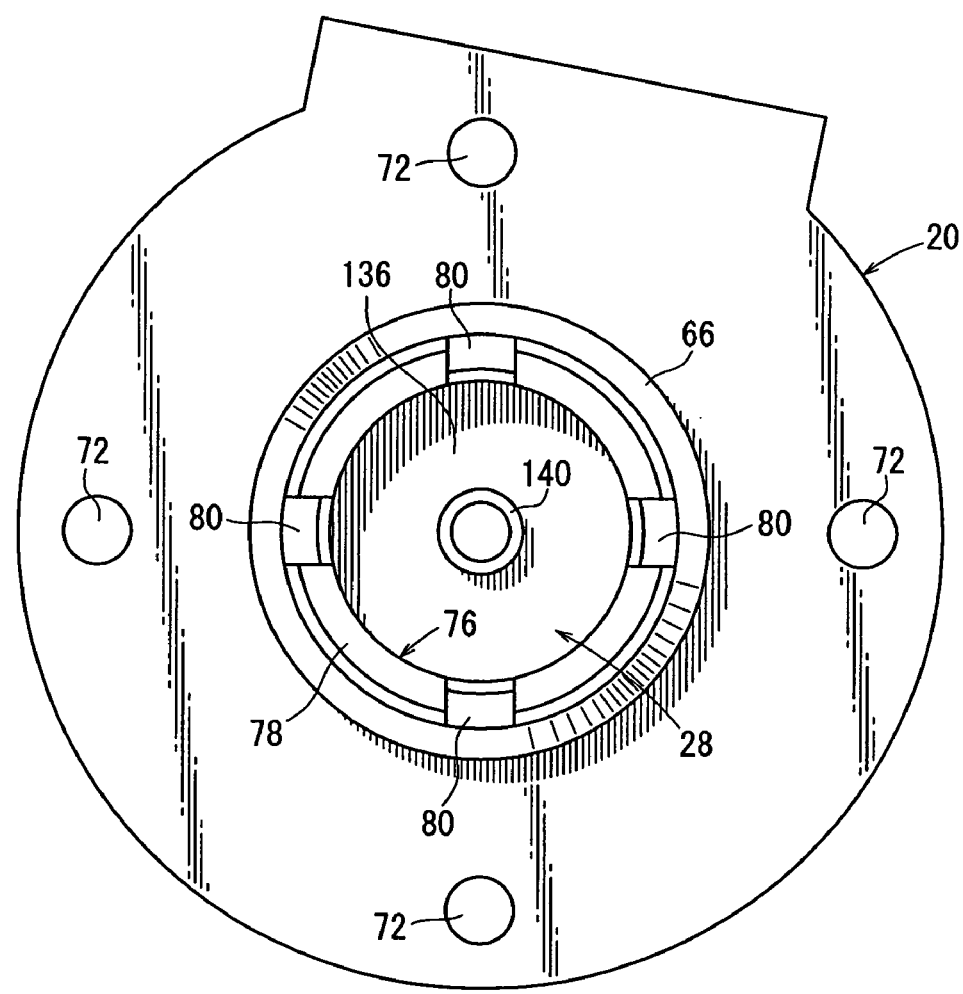
FIG. 7 is a bottom view of a flange of the collar guide shown in FIG. 4.

In FIGS. 4 through 6, one of the recesses 80 in the flange 78 is cross-sectionally shown on the right side of the center of the collar guide 76, and a portion of the flange 78 which is engageable by the valve head 28 is cross-sectionally shown on the left side of the center of the collar guide 76.

The collar guide 76 has an upper end portion extending upwardly out of the hollow cylinder 66 of the guide body 20 into a bobbin 82, to be described later, of the solenoid 24.

The solenoid housing 22 is integrally molded of a resin material and is coupled to the upper end of the guide body 20. A connector 84 for being electrically connected to a power supply, not shown, for supplying an electric current to the solenoid 24 is mounted on a side surface of the solenoid housing 22. The connector 84 has a pair of terminals 86 of metal disposed therein and having exposed end portions. The terminals 86 are electrically connected to the bobbin 82 of the solenoid 24 through the solenoid housing 22. When the solenoid-operated valve 10 is in use, the terminals 86 are electrically connected to the power supply through leads, not shown.

The solenoid housing 22 includes a flange 88 projecting radially inwardly from an upper end thereof. The flange 88 has an annular groove defined in an upper end face thereof and accommodating an O-ring 58c therein. The O-ring 58c is clamped between the solenoid housing 22 and the cover member 26, to be described later, thereby hermetically sealing the gap between the solenoid housing 22 and the cover member 26.

The cover member 26 is made of a magnetic metallic material and has a substantially inverted U-shaped cross section. The cover member 26 is mounted so as to surround upper portions of the solenoid housing 22 and the guide body 20. The cover member 26 has a hole 90 defined substantially centrally in an upper end thereof. A fixing member 96, to be described later, has an externally threaded knob 108 projecting upwardly from its upper end face and inserted through the hole 90. Since the cover member 26 has a substantially inverted U-shaped cross section, it is lightweight, and can be manufactured at a reduced cost because the amount of metallic material used is small.

Figure 2:
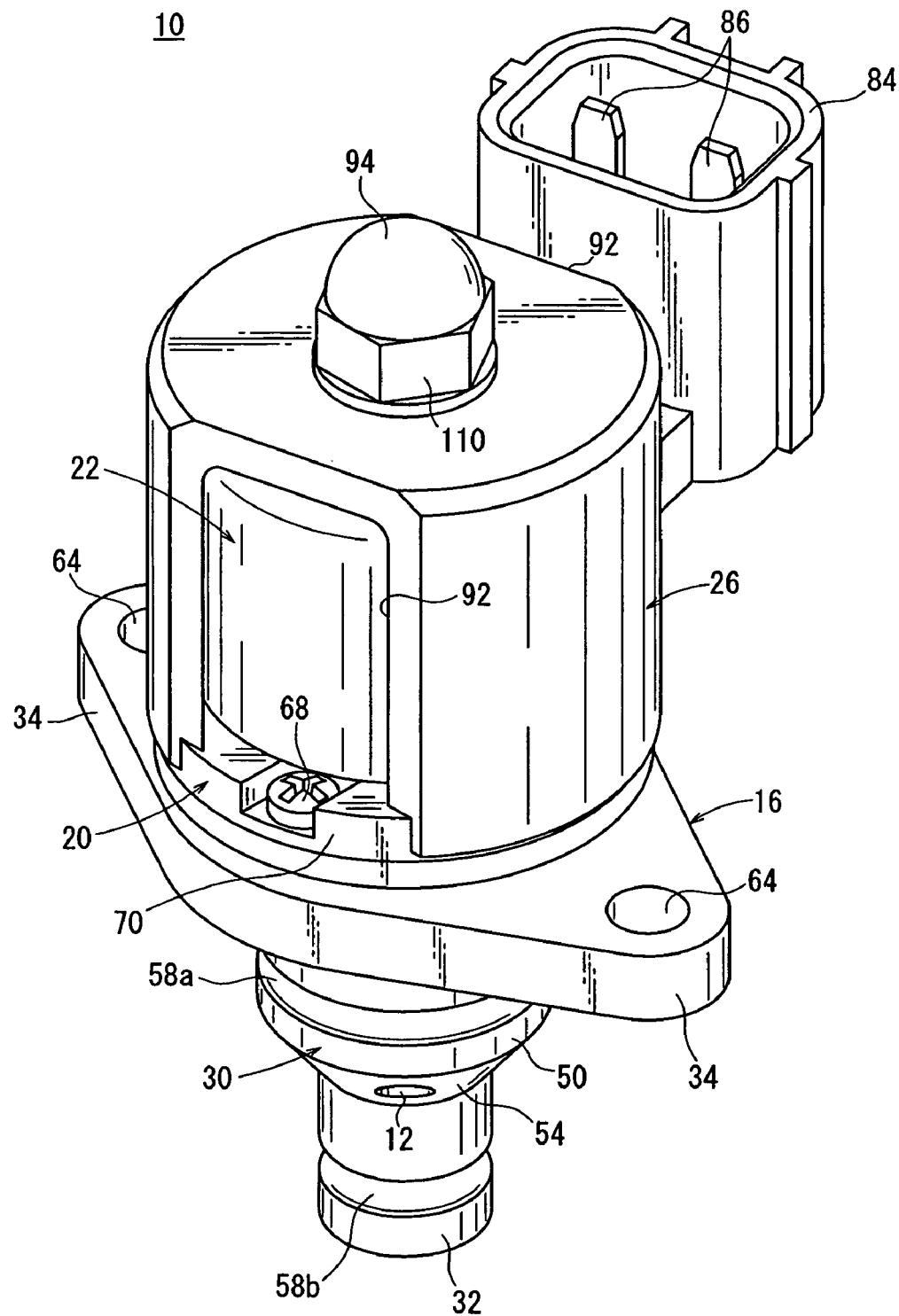
FIG. 2 is a perspective view of the solenoid-operated valve according to the embodiment of the present invention.

As shown in FIGS. 2 and 3, the cover member 26 has a plurality of, e.g., two, axially elongate rectangular openings 92 defined in a side wall thereof. The openings 92 are positioned substantially symmetrically, i.e., diametrically opposite to each other, with respect to the center of the cover member 26 (see FIG. 3). The interior of the cover member 26 communicates with the exterior thereof through the openings 92. The solenoid housing 22 covering the solenoid 24 is partly exposed through the openings 92. Therefore, when the coil 81 of the solenoid 24 is heated upon energization thereof, the heat is radiated from the solenoid housing 22 through the openings 92.

As shown in FIGS. 4 and 5, the solenoid 24 is disposed in the solenoid housing 22. The solenoid 24 comprises a bobbin 82 disposed in the solenoid housing 22, a coil 81 wound around the bobbin 82, the movable member 18 axially displaceably disposed in the bobbin 82, the fixing member 96 coupled to the upper end of the solenoid housing 22 by a cap nut 94 and disposed in axially confronting relation to the movable member 18, and a return spring 98 interposed between the movable member 18 and the fixing member 96.

The bobbin 82 is in the form of a hollow cylinder and is disposed in abutment against the inner circumferential surface of the solenoid housing 22. The bobbin 82 as a first large-diameter flange 100a and a second large-diameter flange 100b disposed respectively on upper and lower ends thereof and extending radially outwardly. The coil 81 is wound around the bobbin 82 axially between the first large-diameter flange 100a and the second large-diameter flange 100a. The bobbin 82 is integrally molded with the solenoid housing 22.

The first large-diameter flange 100a is held against a lower surface of the flange 88 of the solenoid housing 22, and the second large-diameter flange 100b has an engaging ledge 102 on an outer circumferential region thereof. The engaging ledge 102 projects downwardly and has a lower surface inclined at a certain angle. The engaging ledge 102 is engaged with an upwardly bent edge 104 projecting radially inwardly from the lower end of the solenoid housing 22. The bobbin 82 with the coil 81 wound therearound is disposed in and integrally formed with the solenoid housing 22, and is surrounded in its entirety by the solenoid housing 22.

The bobbin 82 has a through hole 106 extending axially therethrough. The collar guide 76 fixed to the hollow cylinder 66 of the guide body 20 is inserted in a lower portion of the through hole 106. The fixing member 96, which is made of a magnetic metallic material, is inserted in an upper portion of the through hole 106. The through hole 106 has a diameter substantially equal to the outside diameter of the collar guide 76.

After the externally threaded knob 108 of the fixing member 96 is inserted through the hole 90 in the cover member 26, a washer 110 is placed around the externally threaded knob 108, and the cap nut 94 is threaded over the externally threaded knob 108, fastening the fixing member 96 to the solenoid housing 22.

The fixing member 96 includes a reduced-diameter portion 112 facing the movable member 18. The collar guide 76 fixed to the guide body 20 has an upper end portion mounted on the reduced-diameter portion 112. Specifically, as shown in FIG. 6, the collar guide 76 is welded to the fixing member 96 by laser beam welding, and hence is firmly secured to the fixing member 96. The fixing member 96 is thus secured to the guide body 20 by the cylindrical collar guide 76.

The fixing member 96, the guide body 20, and the collar guide 76 are therefore integrally joined to each other by laser beam welding, improving workability.

The reduced-diameter portion 112 of the fixing member 96 has a diameter smaller than the remaining portion of the fixing member 96 by a value commensurate with the thickness of the collar guide 76. Therefore, the outer circumferential surface of the collar guide 76 mounted on the reduced-diameter portion 112 lies substantially flush with the outer circumferential surface of the fixing member 96, i.e., the outside diameter of the collar guide 76 is essentially the same as the outside diameter of the fixing member 96. The movable member 18 is inserted in the collar guide 76 beneath the fixing member 96.

The fixing member 96 has a land 114 disposed substantially centrally on the lower surface thereof and projecting downwardly toward the movable member 18. The return spring 98 interposed between the movable member 18 and the fixing member 96 has an upper end disposed around the land 114.

The movable member 18 is in the form of a hollow cylinder made of a magnetic metallic material. The movable member 18 has a spring retaining hole 116 defined centrally in an upper end portion facing the fixing member 96, the spring retaining hole 116 having a predetermined depth. The spring retaining hole 116 is positioned in axially confronting relation to the land 114 of the fixing member 96. The return spring 98 interposed between the movable member 18 and the fixing member 96 is housed almost entirely in the spring retaining hole 116. The return spring 98 biases the movable member 18 to move in a direction away from the fixing member 96.

The movable member 18 also has a plurality of axial slots 118 defined axially in an outer circumferential surface thereof and angularly spaced at predetermined intervals in the circumferential direction of the movable member 18. The slots 118 are of a substantially V-shaped cross section throughout the axial length of the movable member 18.

The slots 118 defined in the outer circumferential surface of the movable member 18 allow the fluid existing between the movable member 18 and the fixing member 96 to flow therethrough toward the valve head 28. Therefore, the movable member 18 can smoothly be displaced without being subject to a resistance which would otherwise be posed by the fluid trapped between the movable member 18 and the fixing member 96.

The movable member 18 has a small-diameter hole 120 and a large-diameter hole 122 that are defined coaxially in an opposite end portion thereof. The small-diameter hole 120 receives therein a portion of the valve head 28. The large-diameter hole 122 is larger in diameter than the small-diameter hole 120. The small-diameter hole 120 and the large-diameter hole 122 communicate with the spring retaining hole 116.

The valve head 28 includes a shaft 124 coupled to the movable member 18 and a valve 126 disposed downwardly of and joined to the shaft 124. The valve 126 can be seated on and unseated from the valve seat surface 62 of the main body 30 of the valve housing 16.

The shaft 124 is made of a metallic material. The shaft 124 includes a first shaft segment 128 press-fitted into the small-diameter hole 120 in the movable member 18, a second shaft segment 130 greater in diameter than the first shaft segment 128 and inserted in the larger-diameter hole 122 in the movable member 18, and a third shaft segment 132 greater in diameter than the second shaft segment 130 and engaging a lower end face of the movable member 18. Since the first shaft segment 128 of the shaft 124 is press-fitted into the small-diameter hole 120 in the movable member 18, the valve head 28 and the movable member 18 are firmly coupled to each other.

The valve 126 is disposed in the communication chamber 56 in the valve housing 16. The valve 126 comprises a large-diameter portion 134 connected to the lower end of the third shaft segment 132 of the shaft 124 and having a diameter larger than the third shaft segment 132, and a resilient member 136 made of an elastic material such as fluororubber or the like and surrounding the large-diameter portion 134.

The large-diameter portion 134 is substantially disk-shaped and has a diameter smaller than the diameter of the communication chamber 56 in which the valve head 28 is disposed. The large-diameter portion 134 has a plurality of through holes 138 defined axially therethrough and angularly spaced at predetermined intervals.

The resilient member 136 is formed to cover the large-diameter portion 134 in its entirety by placing the large-diameter portion 134 in a mold, not shown, filling the mold with the elastic material, and then curing the elastic material. The resilient member 136 includes outer layers of substantially constant thickness covering outer circumferential and lower surfaces of the large-diameter portion 134. Since the resilient member 136 has portions filling the through holes 138 that extend between the upper and lower surfaces of the large-diameter portion 134, the resilient member 136 is prevented from being vertically displaced with respect to the large-diameter portion 134 and hence from dislodged from the large-diameter portion 134. Since the valve head 28 has the large-diameter portion 134 placed centrally in and surrounded by the resilient member 136, the valve head 28 has increased mechanical strength.

The seating ridge (annular ridge) 140 is disposed substantially centrally on a lower surface of the resilient member 136 and projects annularly downwardly therefrom. The seating ridge 140 has a diameter greater than the communication passage 60 that is open in the main body 30 of the valve housing 16. When the seating ridge 140 is held against the valve seat surface 62 of the main body 30 and covers an outer circumferential region around the communication passage 60, the communication chamber 56 and the outlet port 14 are held out of fluid communication with each other. The resilient member 136 has a recess defined centrally within the seating ridge 140 and extending to the large-diameter portion 134, which is thus exposed through the recess.

The resilient member 136 is substantially equal in diameter to the communication chamber 56. Stated otherwise, the resilient member 136 has its outer circumferential edge positioned between the outer circumferential surface of the large-diameter portion 134 which is smaller in diameter than the communication chamber 56 and the inner circumferential surface of the communication chamber 56.

The discharge valve 10 for use with fuel cells according to the embodiment of the present invention is basically constructed as described above. Operation and advantages of the discharge valve 10 will be described below.

In FIG. 1, the discharge valve 10 is disposed at a suitable position in the passage between the hydrogen discharge port 218 and the hydrogen discharger 216, and mounted on the holder block 36, for example. The inlet port 12 (see FIGS. 4 and 5) of the discharge valve 10 is connected to the above-mentioned passage through the inlet passage 42 in the holder block 36. The outlet port 14 (see FIGS. 4 and 5) is connected to the passage through the outlet passage 46 in the holder block 36.

FIG. 4 shows the position of the parts of the discharge valve 10 when the coil 81 is not supplied with an electric current, i.e., when the coil 81 is not energized. In this position, the discharge valve 10 is in an off state (closed state) wherein the seating ridge 140 of the valve head 28 is seated on the valve seat surface 62 on the bottom wall 52 of the main body 30, blocking fluid communication between the inlet port 12 and the outlet port 14.

In the off state, when the non-illustrated power supply is turned on to supply an electric current to the terminals 86 of the connector 84 through the leads, the coil 81 connected to the terminals 86 is energized to generate magnetic fluxes which flow from the coil 81 to the movable member 18 and then back to the coil 81.

As shown in FIG. 5, the movable member 18 is displaced axially upwardly against the bias of the return spring 98, causing the seating ridge 140 of the valve head 28 off the valve seat surface 62 of the main body 30.

The upper surface of the resilient member 136 mounted on the valve head 28 hits the flange 78 of the collar guide 76, whereupon the valve head 28 reaches a displacement end position. Since the resilient member 136 is made of an elastic material, it dampens impact at the time the valve head 28 hits the flange 78 in the displacement end position, thus reducing impact noise. The discharge valve 10 now changes from the off state to an on state (open state).

The fluid and/or the residual water introduced from the inlet passage 42 in the holder block 36 through the inlet port 12 into the communication chamber 56 flows through the clearance between the seating ridge 140 of the valve head 28 and the valve seat surface 62, and then is discharged from the communication passage 60 through the outlet port 14 and the outlet passage 46 out of the holder block 36.

The discharge valve 10 is switched from the on state to the off state wherein the fluid and/or the residual water is prevented from being discharged, as follows:

The electric current supplied from the non-illustrated power supply to the coil 81 is interrupted to de-energize the coil 81, eliminating the force tending to displace the movable member 18 upwardly. Therefore, the movable member 18 is pressed downwardly under the resilient force of the return spring 98, and the upper surface of the resilient member 136 of the valve head 28 is separated from the lower surface of the flange 78.

While the resilient member 136 was held in abutment against the lower surface of the flange 78, the recesses 80 provide clearances (spaces) between the upper surface of the resilient member 136 and the lower surface of the flange 78. Therefore, the resilient member 136 is prevented from sticking to the flange 78. Accordingly, when the valve head 28 is displaced downwardly, the resilient member 136 is reliably and easily separated from the flange 78.

The annular seating ridge 140 of the valve head 28 is seated on the valve seat surface 62 of the main body 30, closing the outer circumferential region of the communication passage 60. Therefore, the flow of the fluid from the inlet port 12 through the communication chamber 56 to the outlet port 14 is blocked. As a result, the fluid and/or the residual water introduced through the hydrogen supply passage into the discharge valve 10 stops being discharged from the discharge valve 10.

Even if the valve head 28 is radially displaced out of coaxial alignment with the communication passage 60, since the valve seat surface 62 of the main body 30 is substantially flat, the seating ridge 140 of the valve head 28 can reliably and appropriately be seated on the valve seat surface 62. The valve head 28 can thus well seated on the valve seat surface 62.

According to the present embodiment, as described above, the valve housing 16 is constructed of the main body 30 in the form of a bottomed hollow cylinder with the valve head 28 housed therein, and the cylindrical boss 32 with the outlet port 14 defined therein. The inlet ports 12 are defined through the corner where the main body 30 and the boss 32 are joined to each other, substantially perpendicularly to the tapered surface 54, at spaced positions circumferentially along the tapered surface 54. Therefore, the main body 30 and the boss 32 can be inserted and assembled in a companion member such as the holder block 36, for example.

As the main body 30 and the boss 32 can be accommodated and assembled in a companion member such as the holder block 36, the valve housing 16 as it is mounted on the companion member projects a reduced distance from the companion member. Consequently, the installed discharge valve 10 is relatively small in size. The discharge valve 10 occupies less space in environments where it is installed.

The main body 30 is in the form of a bottomed hollow cylinder and the substantially flat tapered surface 54 is provided at the joint between the side wall 50 and the bottom wall 52. The inlet ports 12 are formed substantially perpendicularly to the substantially flat tapered surface 54, unlike discharged valves where inlet ports are formed in a curved outer circumferential surface of the main body 30. Consequently, the inlet ports 12 can be machined easily and efficiently.

Since the inlet ports 12 are formed in the joint between the side wall 50 and the bottom wall 52, the joint which would otherwise not be used is effectively utilized. As there is no need for a new space for providing the inlet ports 12, and the valve housing 16 may have its longitudinal dimension reduced in the axial direction.

The boss 32 that is defined on the bottom wall 52 of the main body 30 with the inlet ports 12 has the outlet port 14. Therefore, the inlet ports 12 and the outlet port 14 are defined in the single valve housing 16.

The movable member 18 and the valve head 28 are separate from each other. Consequently, the movable member 18 and the valve head 28 may be made of metallic materials having different properties, e.g., the movable member 18 of a magnetic material and the valve head 28 of a nonmagnetic material such as stainless steel. If the valve head 28 is made of stainless steel, then it is prevented from being corroded and hence has increased durability. The movable member 18 can easily be machined as only the small-diameter hole 120 and the large-diameter hole 122 for receiving the valve head 28 to be press-fitted therein need to be formed substantially centrally in the movable member 18.

Although a certain preferred embodiment of the present invention have been shown and described in detail, it should be understood that various changes and modifications may be made therein without departing from the scope of the appended claims.

What is claimed is:

1. A solenoid-operated valve for discharging a reaction gas and/or residual water from fuel cells, comprising:
   a valve housing including a bottomed first hollow cylindrical portion having an inlet port for introducing the reaction gas and/or residual water, and a second hollow cylindrical portion projecting coaxially from an end of said first hollow cylindrical portion and having an outlet port for discharging the reaction gas and/or residual water;
   a solenoid housing coupled to said valve housing;
   a solenoid disposed in said solenoid housing, said solenoid being energizable by an electric current supplied thereto;
   a fixing member disposed in said solenoid;
   a movable member disposed in confronting relation to said fixing member, said movable member being displaceable axially when said solenoid is energized; and
   a valve head comprising a shaft coupled to said movable member and a valve being seated on or unseated from a valve seat, said valve comprising;
      a large-diameter portion having a diameter greater than said shaft, said large-diameter portion being disposed on an end of said shaft; and
      a resilient member mounted in surrounding relation to said large-diameter portion, said resilient member being made of an elastic material, wherein said valve head is seated on or unseated from said valve seat in said valve housing in accordance with displacement of said movable member;
   wherein said large-diameter portion has a through hole defined therein and extending in a direction in which said valve is displaceable, said resilient member being integrally combined with said large-diameter portion through said through hole.

2. A solenoid-operated valve according to claim 1, wherein said first hollow cylindrical portion has a tapered surface along an outer circumferential surface thereof, said tapered surface being inclined at a predetermined angle to the axis of said first hollow cylindrical portion, said inlet port being defined in said tapered surface.

3. A solenoid-operated valve according to claim 2, wherein said inlet port comprises a plurality of inlet ports spaced at intervals along said tapered surface, and the sum of respective cross-sectional areas of said inlet ports is greater than the cross-sectional area of said outlet port.

4. A solenoid-operated valve according to claim 1, wherein said first hollow cylindrical portion comprises a cylindrical side, a bottom with said second hollow cylindrical portion being disposed thereon, and a joint by which said cylindrical side and said bottom are joined to each other, said inlet port being defined in said joint, said bottom having a communication passage defined substantially centrally therein and communicating with said outlet port through said second hollow cylindrical portion.

5. A solenoid-operated valve according to claim 1, wherein said resilient member has an annular ridge projecting toward said valve seat, said annular ridge being disposed coaxially with a communication passage in fluid communication with said outlet port and being open at said valve seat, the arrangement being such that when said annular ridge is seated on said valve seat, said annular ridge covers an outer circumferential region around said communication passage in said valve seat.

6. A solenoid-operated valve according to claim 5, wherein said valve seat comprise a substantially flat surface in said first hollow cylindrical portion.

7. A solenoid-operated valve according to claim 1, wherein said movable member has a slot defined in an outer circumferential surface and extending axially inwardly thereof.

8. A solenoid-operated valve according to claim 1, further comprising a cover member having a substantially inverted U-shaped cross section, said solenoid housing being surrounded by said cover member.

9. A solenoid-operated valve according to claim 8, wherein said cover member has an opening defined therein and providing communication between an interior of said cover member and an exterior thereof, said solenoid housing which surrounds said solenoid being partly exposed through said opening.

10. A solenoid-operated valve according to claim 9, further comprising a guide member disposed in said solenoid for guiding said movable member for axial displacement, wherein said fixing member is coupled to said cover member, said fixing member having an end disposed in said solenoid and fixed to said guide member.

11. A solenoid-operated valve for discharging a reaction gas and/or residual water from fuel cells, comprising:

a valve housing including a bottomed first hollow cylindrical portion having an inlet port for introducing the reaction gas and/or residual water, and a second hollow cylindrical portion projecting coaxially from an end of said first hollow cylindrical portion and having an outlet port for discharging the reaction gas and/or residual water;

a solenoid housing coupled to said valve housing;

a solenoid disposed in said solenoid housing, said solenoid being energizable by an electric current supplied thereto;

a fixing member disposed in said solenoid;

a movable member disposed in confronting relation to said fixing member, said movable member being displaceable axially when said solenoid is energized;

a valve head coupled to said movable member being seated on or unseated from a valve seat in said valve housing when said movable member is displaced;

a cylindrical guide member disposed in said solenoid for guiding said movable member for axial displacement; and a guide body disposed between said valve housing and said solenoid housing, said guide body being fixed to said guide member, wherein said guide member has a recess defined in an end thereof, said recess providing a clearance between said guide member and a valve of said valve head when said valve abuts against said guide member.

* * * * *